United States Patent
Negi et al.

(10) Patent No.: US 6,258,464 B1
(45) Date of Patent: Jul. 10, 2001

(54) RESIN COMPOSITION AND MULTILAYERED STRUCTURE COMPRISING THE SAME

(75) Inventors: Taichi Negi; Kaoru Ikeda; Hiromichi Nakano, all of Kurashiki (JP)

(73) Assignee: Kuraray Co., Ltd., Kurashiki (JP)

( * ) Notice: Subject to any disclaimer, the term of this patent is extended or adjusted under 35 U.S.C. 154(b) by 0 days.

(21) Appl. No.: 09/502,249

(22) Filed: Feb. 17, 2000

Related U.S. Application Data

(63) Continuation of application No. 08/937,204, filed on Sep. 9, 1997, now abandoned, which is a continuation of application No. 08/435,215, filed on May 5, 1995, now abandoned.

(30) Foreign Application Priority Data

May 12, 1994 (JP) .................................................... 6-124183

(51) Int. Cl.$^7$ .............................. B32B 27/08; B32B 27/32
(52) U.S. Cl. .......................... 428/516; 428/515; 428/520
(58) Field of Search .................................... 428/515, 516, 428/520

(56) References Cited

U.S. PATENT DOCUMENTS 5,310,788 * 5/1994 Moriyama et al. ..................... 525/57
5,322,877 * 6/1994 Moriyama et al. .................. 524/399
5,492,953 * 2/1996 Itamura et al. ...................... 524/239

FOREIGN PATENT DOCUMENTS 0 483695 A2 * 5/1992 (EP) .

* cited by examiner

Primary Examiner—Ana Woodward
(74) Attorney, Agent, or Firm—Cummings & Lockwood

(57) ABSTRACT

A resin composition comprises a polyolefin (A), a saponified product (B) of an ethylene-vinyl ester copolymer having an ethylene content of from 10 to 70 mole % and a saponification degree of the vinyl ester component of not less than 80%, and an olefin-unsaturated dicarboxylic anhydride-unsaturated carboxylic ester or vinyl ester copolymer (C), wherein the following formulas (I) and (II) are satisfied $$1/99 \leq \text{weight of } (B)/\text{weight of } (A) \leq 40/60 \qquad (I)$$

$$0.1/99.9 \leq X \leq 20/80 \qquad (II)$$

wherein X=weight of (C)/total weight of (A) and (B). A multilayered structure comprising at least a layer of the above resin composition and a layer made of a saponified product of an ethylene-vinyl ester copolymer.

4 Claims, No Drawings

RESIN COMPOSITION AND MULTILAYERED STRUCTURE COMPRISING THE SAME

This application is a continuation of U.S. application Ser. No. 08/937,204, filed Sep. 9, 1997, now abandoned, which is a continuation of U.S. application Ser. No. 08/435,215, filed May 5, 1995, now abandoned, from which priority is claimed, the disclosures of which are incorporated in their entirety herein by reference.

BACKGROUND OF THE INVENTION

1. Field of the Invention

This invention relates to a resin composition which has good compatibility of individual components contained therein and is substantially free of any flow anomaly, and also to a multilayered structure which exhibits a good appearance and has good impact resistance, delamination resistance, and gas barrier properties.

2. Description of the Prior Art

Multilayered plastic packaging materials are known wherein a layer of a thermoplastic resin, particularly a polyolefin resin (hereinafter referred to simply as PO), having good moistureproofing and mechanical characteristics and a layer of a saponified product of an ethylene-vinyl ester copolymer (hereinafter referred to simply as EVOH) having good oxygen barrier properties are laminated through an adhesive resin. Such packaging materials have wide utility in various fields such as of foods, cosmetics, medicines and chemicals, toiletries and the like as containers having good oxygen barrier properties in the form of bottles, cups, pouches and the like.

When the multilayered plastic containers are fabricated, it is inevitable that burrs be undesirably produced owing to the pinch-off for blow molding and regrinds (scraps) such as of waste plastics after punching be left for cup molding. Accordingly, the re-use of these inevitable scraps has been accepted as being necessary from the standpoint of costs and resource saving. In order to effectively re-use the regrinds, there have been proposed several methods including a method wherein the regrinds are mixed in the thermoplastic resin layer primarily made of a polyolefin (Japanese Patent Publication No. Sho 59-29409), and a method wherein a regrind layer is provided between the thermoplastic layer such as of a polyolefin and the EVOH layer (Japanese Patent Laid-open No. Sho 59-101338). However, where regrind resins containing thermoplastic resins, especially polyolefin resins, and the EVOH are subjected to co-melt extrusion molding, the EVOH tends to deteriorate. During the course of the blend melt extrusion, black deposits ("charred resin") may be formed in the inside of the extruder, or gel-like matters ("lip stain") may be deposited such as on the dielip during the extrusion. This eventually leads to the troubles such as the formation of foreign matters resulting from non-uniform phase separation, flow anomalies, a lowering in appearance of the resultant molded container, the generation of offensive odor from the decomposed resins, lowerings of mechanical characteristics such as impact resistance, and the like. Thus, the extrusion molding of such a composition as mentioned above has been substantially impossible to perform, or can, if ever, be carried out only for a short time in most cases. On the other hand, where the blend of a polyolefin and EVOH and EVOH are subjected to co-extrusion molding, wavy patterns are formed on the surfaces of molded articles, along with delamination (intralayer and interlaminar separations) occurring in the articles.

Japanese Patent Laid-open No. Sho 49-57086 (corresponding to U.S. Pat. No. 3,931,449) has proposed the blends of thermoplastic resins having carbonyl groups at the main chain or side chains thereof (e.g., ionomers, maleic anhydride-grafted polypropylene, ethylene-maleic anhydride copolymer and the like) with low density polyethylene and EVOH in order to improve working properties thereof. Japanese Patent Laid-open No. Hei 3-72539 (corresponding to European Patent 401,666) has proposed the blends of an EVOH having a high content of ethylene and polyolefins modified through grafting of unsaturated carboxylic acids thereto, with polyolefins and EVOH so as to improve the appearance of molded articles obtained therefrom. Further, Japanese Patent Laid-open No. Hei 5-98084 has proposed the blends of unsaturated carboxylic acid-modified polyolefins with polyolefins and EVOH in order to improve a resistance to environmental stress-cracking.

However, as will become apparent from Comparative Examples 5 to 7 and 12 to 14, the compositions comprising ionomers, maleic anhydride-grafted polypropylene and ethylene-maleic anhydride copolymer, respectively, are not satisfactory with respect to the impact resistance and the intralayer separation strength.

Moreover, it is stated in Japanese Patent Laid-open No. Sho 61-111346 (U.S. Pat. No. 4,619,969) that the impact resistance is improved by blending copolymers of ethylene, unsaturated dicarboxylic acid anhydrides and unsaturated esters having from 4 to 12 carbon atoms.

In Japanese Patent Laid-open No. Hei 2-16163, it is set out that blending of inorganic fillers and copolymers of ethylene, acrylic esters and maleic acid derivatives with thermoplastic resins such as EVOH can suppress whitening on mechanical rubbing. However, the above-mentioned U.S. Pat. No. 4,619,969 and the Japanese Patent Laid-open No. Hei 2-16163 do not set forth the use of the ethylene-maleic anhydride-acrylic ester copolymer as a compatible agent for EVOH and polyolefins.

SUMMARY OF THE INVENTION

It is accordingly an object of the present invention to provide a resin composition which can overcome flow anomalies such as charring, lip stain and the like and wherein scrap resin compositions such as regrinds are effectively re-used.

It is another object of the invention to provide molded articles, particularly multilayered structures, using at least such a resin composition as mentioned above which are substantially free of any wavy pattern and have a good appearance along with good impact resistance, interlaminar separation resistance and gas barrier properties.

The above objects can be achieved, according to one embodiment of the invention, by a resin composition which comprises:

(A) a polyolefin (abbreviated as PO (A));

(B) a saponified product of an ethylene-vinyl ester copolymer having an ethylene content of from 10 to 70 mole %, and a saponification degree of the vinyl ester component of not less than 80%, and a melting point of from 125° C. to 220° C. (abbreviated as EVOH (B)); and (C) an olefin-unsaturated dicarboxylic anhydride-unsaturated carboxylic ester or vinyl ester copolymer (abbreviated as modified PO (C))

wherein the following formulas (I) and (II) are satisfied $$1/99 \leq \text{weight of }(B)/\text{weight of }(A) \leq 40/60 \qquad (I)$$

$$0.1/99.9 \leq X \leq 20/80 \qquad (II)$$

wherein X=weight of (C)/total weight of (A) and (B).

According to another embodiment of the invention, there is also provided a multilayered structure which comprises at least two layers including a layer made of the composition defined above and a layer made of a saponified product of an ethylene-vinyl ester copolymer (abbreviated as EVOH (B)) having an ethylene content of 10 to 70 mole % and a saponification degree of the vinyl ester component of not less than 90%.

DETAILED DESCRIPTION OF PREFERRED EMBODIMENTS

In the practice of the invention, the polyolefins (A) (PO (A)) used in the resin composition include, for example, olefin homopolymers or copolymers of olefins and monomers copolymerizable with the olefins such as polyethylene resins, polypropylene resins, polystyrene resins, ionomers, ethylene-vinyl acetate copolymers, ethylene-(meth)acrylate copolymers, ethylene-propylene copolymers, ethylene-butylene copolymers and the like. Of these, polyethylene resins such as low density polyethylene, medium density polyethylene, high density polyethylene and linear low density polyethylene, polypropylene resins, ethylene-propylene copolymers and ethylene-butylene copolymers are preferred. The polyolefins, especially polyethylene resins, should preferably have a melt index (MI, determined at 190° C. under a load of 2160 g) of from 0.01 to 100 g/10 minutes, more preferably from 0.01 to 50 g/10 minutes, more preferably from 0.01 to 30 g/10 minutes, and most preferably from 0.01 to 10 g/10 minutes.

The EVOH (B) means a saponified product of an ethylene-vinyl ester copolymer. The ethylene content in the product should be in the range of from 10 to 70 mole %, preferably from 20 to 65 mole %, and most preferably from 20 to 53 mole %, and the degree of saponification of vinyl ester should be not less than 80%, preferably not less than 85%, and more preferably not less than 90%. A melting point of the EVOH (B) is set to from 125° C. to 220° C., more preferably from 130° C. to 220° C., and most preferably from 135° C. to 220° C. If the ethylene content is less than the above range and a melting point exceeds the above range, melt moldability becomes poor. On the other hand, when the content exceeds the above range, the gas barrier properties become unsatisfactory. When the degree of saponification is less than the above range and a melting point exceeds the above range, gas barrier properties and thermal stability degrade and generation of gels and hard spots is increased. This is apparent from Comparative Example 15, later described. The ethylene content and the degree of saponification of the EVOH can be determined by a nuclear magnetic resonance (NMR) method; and a melting point, by a differential scanning calorimetry (DSC) method (scanning speed: 10° C./min.). The EVOH should preferably have a melt index (MI, determined at 230° C. under a load of 2160 g) of from 0.5 to 200 g/10 minutes, more preferably from 2 to 80 g/10 minutes.

In the practice of the invention, the vinyl esters used for the preparation of the EVOH typically include vinyl acetate. Other aliphatic vinyl esters such as vinyl propionate, vinyl pivalate and the like may also be used. If a vinylsilane compound is present as a copolymerizable component of EVOH in an amount of from 0.0002 to 0.2 mole %, matching in melt viscosity between a substrate and the EVOH is improved. This not only permits a homogenous co-extruded multilayered film to be produced, but also contributes to improving dispersability on blending of EVOH, thus being effective in improving moldability. Examples of the vinylsilane compound include vinyltrimethoxysilane, vinyltriethoxysilane, vinyltri(β-methoxy-ethoxy)silane, γ-methacryloxypropylmethoxysilane and the like. Of these, vinyltrimethoxysilane and vinyltriethoxysilane are preferred. Further, other co-monomers may be used in amounts not impeding the object of the invention. Such co-monomers include, for example, propylene, butylene, unsaturated carboxylic acids or esters thereof such as (meth)acrylic acid, methyl (meth)acrylate, ethyl (meth)acrylate and the like, vinylpyrrolidones such as N-vinylpyrrolidone, and the like. According to the present invention, two or more kinds of EVOH (B) may be blended, and there may be optionally blended thermal stabilizers, UV absorbers, antioxidants, colorants, fillers, and other resin such as polyamides, partially saponified ethylene-vinyl acetate copolymers and the like within a range not inhibiting the object of the present invention.

The olefin-unsaturated dicarboxylic anhydride-unsaturated carboxylic ester or vinyl ester copolymer (C) (modified PO (C)) should preferably have 10 to 97 wt % of the ethylene component, 1 to 50 wt % of the unsaturated dicarboxylic anhydride component and 1 to 50 wt % of the unsaturated carboxylic ester or vinyl ester, more preferably 20 to 95 wt % of the ethylene component, 1 to 40 wt % of the unsaturated dicarboxylic anhydride component and 2 to 45 wt % of the unsaturated carboxylic ester or vinyl ester, and most preferably 20 to 95 wt % of the ethylene component, 1 to 30 wt % of the unsaturated dicarboxylic anhydride component and 2 to 45 wt % of the unsaturated carboxylic ester or vinyl ester.

When the contents of the respective components are, respectively, within the above-defined ranges, there can be obtained intended compositions capable of yielding molded articles of good quality. Especially, when the content of the unsaturated dicarboxylic anhydride is within a range of 1 to 50 wt % and the resultant resin composition is used in combination with a collected scrap resin for re-use, the efficiency of the collection can be significantly improved. In addition, good thermal stability is ensured, with gels and hard spots being reduced in amounts. Moreover, when the content of the unsaturated carboxylic ester or vinyl ester component is within a range of 1 to 50 wt %, the resultant EVOH is likely to be dispersed finely and acts to significantly improve the compatibility between PO (A) and EVOS (B) and to improve the impact resistance of a final resin composition.

The olefins of the modified PO (C) include, for example, ethylene, propylene, n-butylene, iso-butylene, styrene and the like. Of these, ethylene is preferred in order to obtain a resin composition of high quality.

The unsaturated dicarboxylic anhydride in the modified PO (C) include maleic anhydride, itaconic anhydride, citraconic anhydride and the like, of which maleic anhydride is preferred.

The unsaturated carboxylic esters used in the modified PO (C) include methyl acrylate, ethyl acrylate, butyl acrylate, methyl methacrylate, ethyl methacrylate, butyl methacrylate, 2-ethylhexyl methacrylate, cyclohexyl methacrylate, monoethyl fumarate, monomethyl fumarate and the like. The vinyl esters of the modified PO (C) include aliphatic vinyl esters such as vinyl acetate, vinyl propionate, vinyl pivalate and the like. Of these, (meth)acrylic esters and vinyl acetate are preferred in view of the more improved compatibility between the PO (A) and the EVOH (B) and a more improved impact resistance.

The modified PO (C) should preferably have a melt index (MI, determined at 190° C. under a load of 2160 g) of from 0.1 to 100 g/10 minutes, more preferably from 0.5 to 50 g/10 minutes.

In the practice of the invention, it is important to use, as the modified PO (C), copolymers of olefins, unsaturated dicarboxylic anhydrides, unsaturated carboxylic esters or vinyl esters. With graft polymers of unsaturated dicarboxylic anhydrides to polyolefins, as the content of the unsaturated dicarboxylic anhydride increases, gels and hard spots are unfavorably formed considerably. Presumably, this is caused owing to the degradation of the thermal stability of the graft polymer. In this connection, however, such a graft polymer may be optionally used in combination in amounts not impeding inherent properties of the resin composition of the invention.

In the resin composition of the invention, the ratio by weight between EVOH (B) and PO (A) is in the range of 1/99 to 40/60, preferably 2/98 to 30/70. If the ratio is smaller than 1/99, gas barrier properties unfavorably become poor although relatively good moldability is ensured without addition of any modified PO (C). On the other hand, when the ratio exceeds 40/60, an intended performance cannot be obtained even if the modified PO (C) is added.

The ratio by weight between modified PO (C) and the total of EVOH (B) and PO (A) is in the range of 0.1/99.9 to 20/80, preferably 0.5/99.5 to 18/82. If the ratio is less than 0.1/99.9, an intended performance cannot be obtained. On the other hand, the ratio which exceeds 20/80 is unfavorable from the standpoint of the thermal stability of the resin composition, with the high possibility of hard spots and gels being formed.

The manner of blending PO (A), EVOH (B) and modified PO (C) is not critical and the thermoplastic resins are dry blended and may be used as it is. Preferably, the blend is pelletized by use of a Banbury mixer, a monoaxial or biaxial screw extruder or the like and then dried. When the blend is non-uniform or involves the formation and incorporation of gels or hard spots at the time of the pelletizing operations, there is the great possibility of developing cracks in molded articles. To avoid this, it is preferred to use an extruder which ensures a high degree of kneading during the course of blending and pelletizing operations and to seal the hopper opening with nitrogen gas and extrude the composition at low temperatures. In order to obtain better results, it is preferred that the modified PO (C) is preliminarily melt mixed with part of PO (A) and/or EVOH (B) and the melt is then blended with the balance of PO (A) and/or EVOH (B), followed by melt mixing and molding. The articles molded in this manner has a more improved appearance along with the recovery of scraps being improved significantly. Although the reason why the moldability is improved is not known, it is assumed that when EVOH (A) and modified PO (C) have been preliminarily kneaded, both resins are blended to the level of molecules thereby providing a composition having characteristic properties of both resins and exhibiting increasing compatibility between EVOH (B) and PO (A). As a consequence, the three components are uniformly dispersed to remarkably improve the quality and moldability.

The articles, especially multilayered structures, obtained from the thus obtained resin composition involve a reduced number of defects such as wavy patterns, gels and hard spots and exhibit good impact resistance and intralayer separation resistance. This will become apparent from Examples 6 and 10 appearing hereinafter.

The resin composition of the invention may further comprise a hydrotalcite compound (D) in an amount of from 0.0001 to 2%, preferably from 0.0001 to 1%, based on the total weight of PO(A) and EVOH (B). By the addition of the component (D), the intralayer separation strength of the layer made of the resin composition of the invention can be further improved. This will become apparent from Examples 1 to 4, 8 and 9.

The hydrotalcite compounds include, for example, complex salts represented by $M_xAl_y(OH)_{2x+3y-2z}(A)_z \cdot aH_2O$ wherein M represents Mg, Ca or Zn, A represents $CO_3$ or $HPO_4$; and x, y, z and a are, respectively, a positive value. Preferred compounds include $Mg_6Al_2(OH)_{16}CO_3 \cdot 4H_2O$, $Mg_8Al_2(OH)_{20}CO_3 \cdot 5H_2O$, $Mg_5Al_2(OH)_{14}CO_3 \cdot 4H_2O$, $Mg_{10}Al_2(OH)_{22}(CO_3)_2 \cdot 4H_2O$, $Mg_6Al_2(OH)_{16}HPO_4 \cdot 4H_2O$, $Ca_6Al_2(OH)_{16}CO_3 \cdot 4H_2O$, $Zn_6Al_2(OH)_{16}CO_3 \cdot 4H_2O$, and $Mg_{4.5}Al_2(OH)_{13}CO_3 \cdot 3.5H_2O$.

Additionally, the hydrotalcite compounds include, for example, hydrotalcite solid solutions represented by $[Mg_{0.75}Zn_{0.25}]_{0.67}Al_{0.33}(OH)_2(CO_3)_{0.167} \cdot 0.45H_2O$ and $[Mg_{0.79}Zn_{0.21}]_{0.7}Al_{0.3}(OH)_2(CO_3)_{0.15}$, which are disclosed in Japanese Patent Laid-Open No. Hei 1-308439 (U.S. Pat. No. 4,954,557).

The resin composition of the invention may further comprise a metal salt (E) of a higher aliphatic carboxylic acid in an amount of from 0.0001 to 2%, preferably from 0.001 to 2%, based on the total weight of PO (A) and EVOH (B). By this, the impact resistance can be further improved. This will become apparent from Example 5 appearing hereinafter.

The metal salts of higher aliphatic carboxylic acids are those salts of higher fatty acids having from 8 to 22 carbon atoms. Examples of the higher fatty acids having from 8 to 22 carbon atoms include lauric acid, stearic acid, myristic acid and the like. The metals are those metals of Group I, II or III of the periodic table and include, for example, sodium, potassium, magnesium, calcium, zinc, barium, aluminium and the like. Among these, metals of Group II are preferable.

If an alkali metal compound (F) is added to the resin composition of the invention in an amount of from 5 to 5000 ppm, calculated as an alkali metal ion, relative to EVOH (B), flow anomalies such as charring, lip stain and the like fully disappear, so that the recovery of the resulting scraps can be remarkably improved.

Preferably, the alkali metal ion is added in an amount of from 20 to 1000 ppm, more preferably from 30 to 500 ppm. The alkali metal ions include, for example, lithium ions, sodium ions, potassium ions and the like. Examples of the alkali metal compound include monovalent metal salts of aliphatic carboxylic acids, aromatic carboxylic acids and phosphoric acid, and metal complexes. Specific examples include sodium acetate, potassium acetate, sodium phosphate, lithium phosphate, sodium stearate, potassium stearate, sodium ethylenediaminetetraacetate and the like. Of these, sodium acetate, potassium acetate, sodium phosphate, lithium phosphate, sodium stearate and potassium stearate are preferred.

According to preferred embodiments of the invention, the resin composition of the invention should comprise, aside from the essential components (A) to (C), a combination of (D) and (E), a combination of (D) and (F), a combination of (E) and (F) or a combination of (D), (E) and (F).

Where the moldability is improved using blends of scraps containing PO(A) and EVOH (B) or PO (A), EVOH (B) and adhesive resins with modified PO (C) or a combination of modified PO (C) and the above additive component (D), (E) or (F), it. is more effective to blend these additives after dilution by 1:2 to 100 times with polyolefin resins such as polyethylene, polypropylene and than like on comparison with the case where the modified PO (C) and/or (D), (E) or (F) is blended with the scrap composition as they are. Presumably, this is because the dispersability with the scrap composition is improved.

In order to further improve the resin composition of the invention, one or more of hindered phenol or hindered amine thermal stabilizers in an amount of 0.01 to 1% based on the total weight of PO (A) and EVOH (B). As a matter of course, other additives such as plasticizers, thermal stabilizers, UV absorbers, antioxidants, colorants and fillers may be added to the resin composition.

In the practice of the invention, when PO (A), EVOH (B) and modified PO(C) are blended, an adhesive resin (hereinafter referred to simply as AD) which is able to bond PO (A) and EVOH (B) together may be blended in small amounts of not greater than 20 wt %. AD used is not critical and includes, for example, those adhesive resins which are used to produce multilayered structures as will be described hereinafter.

When at least two layers including a layer comprised or consisting of the resin composition of the invention and a layer containing or consisting of EVOH having an ethylene content of from 10 to 70 mole % and a saponification degree of the vinyl ester component of not less than 90% are laminated particularly through co-extrusion, there can be obtained a multilayered structure which has good gas barrier properties and a good appearance.

It is important that the EVOH used in the second-mentioned layer of the multilayered structure have an ethylene content of from 10 to 70 mole %, preferably from 20 to 65 mole %, most preferably 20 to 53 mole %. If the ethylene content is less than 10 mole %, the melt moldability becomes poor. On the other hand, when the content exceeds 70 mol %, gas barrier properties are not satisfactory. The saponification degree should be not less than 90%, preferably not less than 95%. When the saponification degree is less than 90%, gas barrier properties are poor.

The multilayered structure of the invention may further laminate a protective layer for the EVOH layer as an inner and/or outer layer thereof. Preferably, a thermoplastic resin layer is used for the protective layer.

The EVOH layer serving for the gas barrier properties has a thickness of 5 to 250 $\mu$, preferably from 10 to 100 $\mu$. The resin composition layer has a thickness of from 10 to 3000 $\mu$, preferably from 100 to 3000 $\mu$. The thermoplastic resin used for the inner and/or outer layer is used to impart moistureproofing, heat resistance, heat sealability and mechanical characteristics to the multilayered structure. In addition, the thermoplastic resin is also used to prevent degradation of gas barrier properties owing to the infiltration of moisture into the EVOH layer. The thermoplastic resins are not critical in type and include, for example, the above-mentioned polyolefins {PO(A)} such as polyethylene, ethylene-vinyl acetate copolymers, ethylene acrylic acid copolymers, ethylene-methacrylic acid copolymers, ethylene-acrylate copolymers, polypropylene, polystyrene resins, and further, polyamide resins, polyester resins, polycarbonate resins, polyurethane resins, polyvinyl chloride resins and the like. Of these, the above-mentioned polyolefins such as high density polyethylene and polypropylene are preferred. The resin used as the resin layer may further comprise additives such as antioxidants, colorants, fillers and the like as set out hereinbefore for the resin composition.

For the production of the multilayered structure of the invention, a layer adhesive resin (AD) may be used, if necessary. The adhesive resin (AD) is not critical provided that any adjacent layers can be strongly bonded together therewith. Preferred examples include those polymers obtained by grafting unsaturated carboxylic acids or anhydrides thereof such as maleic anhydride to olefin polymers such as polypropylene, polyethylene and the like, copolymers of ethylene and monomers copolymerizable therewith such as vinyl acetate, acrylates and the like, e.g. ethylene-vinyl acetate copolymer, ethylene-(meth)acrylate (e.g. methyl or ethyl ester) copolymers and the like.

The methods for fabricating the multilayered structure include an extrusion laminating method, a dry laminating method, a co-extrusion laminating method, a co-extrusion sheet molding, a co-extrusion inflation molding method, a solution coating method and the like, wherein lamination is sometimes performed through adhesive resins. For the lamination of the layer portion between the resin composition of the invention and the EVOH, a co-extrusion melt molding method is preferred. In this case, it is preferred that the resin composition which is made of the components (A), (B) and (C) obtained by preliminarily melt mixing modified PO (C) with part of PO (A) and/or EVOH (B) and then blending the resultant mixture with the balance of PO (A) and/or EVOH (B), and the EVOH are subjected to co-extrusion melt molding. By this, the resultant multilayered structure is improved in appearance and is also remarkably improved in the recovery of the resulting scraps. The thus obtained multilayered structure is re-heated at a temperature within a range lower than the melting point of the EVOH and then subjected to monoaxial or biaxial stretching according to a roll orientation method, a pantagraph orientation method or an inflation orientation method thereby obtaining a desired molded article. The multilayered structure may be irradiated with a radiation, an electron beam or the like to cause crosslinkage of the EVOH (B) layer and the thermoplastic resin layer. Alternatively, chemical crosslinking agents may be added at the time of the extrusion molding, thereby causing chemical crosslinkage in the resultant structure.

The thus obtained multilayered structures such as parisons, films. sheets and the like are subjected to orientation through monoaxial, biaxial or blow stretching or are subjected to thermoforming to obtain containers, such as bottles, cups and the like, having inherent physical properties, gas barrier properties and the like characteristic properties. The term "thermoforming" is intended to mean molding operations wherein a sheet is preliminarily heated and softened, followed by deformation by use of a plug and a vacuum forming and simultaneous cooling to obtain molded articles such as cups. The term "heating" is intended to mean a procedure wherein the sheet is allowed to stand at a temperature necessary for the deformation for a given time so that the sheet is in a thermally, substantially uniform condition. Taking the ease in handing into consideration, it is preferred to take a procedure the sheet is uniformly heated by means of various types of heaters.

The multilayered structure is not critical with respect to the thicknesses of the respective layers. In view of the moldability and costs, the thickness of the EVOH (B) layer is preferably in the range of about 0.5 to 20%, more preferably about 1 to 10% of the total thickness of the structure. Typical arrangements of the multilayered structure include, for example, EVOH/AD/resin composition/PO, EVOH/AD/PO/resin composition, EVOH/AD/resin composition/AD/PO, PO/AD/EVOH/AD/resin composition/PO, resin composition/AD/EVOH/AD/resin composition/PO, resin composition/AD/EVOH/AD/PO, and the like. If the PO layers are formed on opposite outer sides of the structure, the PO layers may be made of the same or different resins.

For the fabrication of the multilayered structure, the starting material for the resin composition of the invention may be substituted with the scrap of the multilayered structure. Moreover, the scraps from other polyolefin molded articles may be blended.

Since the multilayered structure having such a layer arrangement as set out hereinabove includes the EVOH layer having good gas barrier properties, the structure is useful in the fields requiring high gas barrier properties as a food packaging material, a packaging material for medical supplies such as medicines, medical instruments and the like, and an industrial material. Alternatively, the structure is also useful as a fuel container such as gasoline or a fuel transport piping material.

For instance, fuel containers or tanks such as gasoline usually have a capacity as great as 40 to 70 liters and should have a good impact resistance. For the material which satisfies the above requirement, there has been preferably used polyethylene, especially high density polyethylene, which has a melt index (MI, determined at 190° C. under a load of 2160 g) of 0.01 to 50 g/10 minutes, preferably 0.01 to 30 g/10 minutes, and most preferably 0.01 to 10 g/10 minutes. However, when scraps obtained at the time of the fabrication of the tank consisting of the high density polyethylene layer having a low MI value and the EVOH layer is collected and re-used, a wavy pattern is formed on the scrap layer owing to the insufficient compatibility caused by a large difference in MI between the high density polyethylene and the EVOH. In addition, the impact resistance is not satisfactory. This problem is fully overcome according to the present invention wherein there is used a resin composition which comprises a blend of PO (A) or high density polyethylene (A) having a low melt index and EVOH (B) with modified PO (C) with or without the components (D), (E) and/or (F).

Where the scrap of a multilayered container having a thick EVOH layer are collected and re-used, there arises the problem that when the content of the EVOH in the scraps becomes high, e.g. 10 to 40 wt %, the scrap layer is not satisfactory with respect to the impact resistance and the intralayer separation resistance. This problem is also overcome according to the invention.

Thus, according to the invention, the scraps of containers, such as gasoline tanks, having a PO (A) layer and an EVOH (B) layer can be effectively recovered and re-used. This is very advantageous from the industrial standpoint.

EXAMPLES

The present invention is described in more detail by way of examples, which should not be construed as limiting the invention thereto.

Example 1

80 parts by weight of polypropylene (MA-6, commercially available from Mitsubishi Petrochemical Co., Ltd.) as PO (A), 10 parts by weight of EVOH (B) having 50 ppm of sodium ions, an ethylene content of 31 mole %, a saponification degree of 99.5% and a melt index (MI, determined at 230° C. under a load of 2160 g) of 7.0 g/10 minutes and a melting point of 183° C., 5 parts by weight of an ethylene (60 wt %)-maleic anhydride (4 wt %)-ethyl acrylate (36 wt %) terpolymer used as modified PO (C), maleic anhydride-grafted polypropylene (QF-500, commercially available from Mitsui Petrochemical Industries, Ltd.) as AD and 0.1 part by weight of hydrotalcite $\{Mg_{4.5}Al_2(OH)_{13}CO_3 \cdot 3.5H_2O\}$ (DHT-4A) were dry blended, followed by melt extrusion by means of a screw having a Madock kneading unit and having a diameter of 40 mm, an L/D value of 24 and a compression ratio of 3.8 thereby obtaining pellets of a resin composition. This resin composition, the PO (A), EVOH (B) and AD were, respectively, charged into separate extruders and subjected to a co-extrusion sheet molding apparatus capable of co-extrusion of four type resins and six layers to obtain a sheet having an arrangement of PO (A)/AD/EVOH (B)/AD/resin composition/PO (A) (film thicknesses: $150\mu/25\mu/100\mu/25\mu/600\mu/100\mu$). The extrusion molding was effected using an extruder having a monoaxial screw with a diameter of 65 mm and an L/D value of 22 at a temperature of 200 to 240° C. for PO(A), an extruder having a monoaxial screw with a diameter of 40 mm and an L/D value of 26 at a temperature of 170 to 210° C. for EVOH (B), an extruder having a monoaxial screw with a diameter of 40 mm and an L/D value of 26 at a temperature of 160 to 220° C. for AD., and an extruder having a monoaxial screw with a diameter of 40 mm and an L/D value of 22 at a temperature of 160 to 210° C. for the resin composition. The feed block die (width of 600 mm) was run at 240° C. After continuous run over 24 hours, a sheet having a good appearance could be obtained, during which little or no phase-separated foreign matters, wavy pattern or flow anomalies (charring and lip stain) resulting from a failure in compatibility were recognized. Moreover, delamination in the resin composition layer (whitening at edge portions on sheet cutting) was slightly, but not appreciably, recognized at such a level that the layer stood use.

Further, according to a known thermoforming (vacuum forming), cups were formed at a sheet temperature of 170° C. at a draw ratio of 1/2 and filled with water, and dropped at 5° C. to determine breakage of the cup. As a result, it was found that the cup was not broken to a height of 1.5 m. The separation strength (i.e. interlaminar separation of the composition layer) {According to T-Peel Test (separation speed: 250 mm/minute)} at the flange portion of the cup was at a practical level of 1.2 kg/15 mm in width.

Example 2

Using the co-extrusion sheet molding apparatus as used in Example 1, there was obtained a multilayered sheet made of three types of resins and five layers and including PO (A)/AD/EVOH (B)/AD/PO (A) layers (layer thicknesses: $425\mu/25\mu/100\mu/25\mu/425\mu$). 95 parts by weight of a milled scrap of the sheet was dry blended with 5 parts by weight of modified PO (C) as used in Example 1 and 0.1 part by weight of the hydrotalcite as used in Example 1, followed by pelletization by use of an extruder having a diameter of 40 mm. The resultant resin composition was used to obtain cups in the same manner as in Example 1. The cups were assessed, revealing a better performance than in Example 1 as will be apparent from the results of Table 1.

Example 3

The general procedure of Example 2 was repeated using, instead of the EVOH (B), an EVOH composition obtained by dry blending 2 parts by weight of the modified PO (C) as used in Example 1 and 10 parts by weight of EVOH (B) and pelletizing the resultant mixture by use of an extruder having a diameter of 40 mm, thereby obtaining a multilayered sheet having a total thickness of 1000 μ and such a layer arrangement of PO (A)/AD/EVOH composition/AD/PO (A) (layer thicknesses: 425μ/25μ/100μ/25μ/425μ). 97 parts by weight of a milled scrap of the sheet was blended with 3 parts by weight of modified PO (C) as used in Example 1 and 0.1 part by weight of the hydrotalcite as used in Example 1, followed by pelletization by use of an extruder having a diameter of 40 mm. The resultant resin composition was used to obtain cups in the same manner as in Example 1, followed by evaluation. The results of the evaluation reveal that a better performance is attained than in Example 1 as will become apparent from Table 1.

Examples 4 to 8

In the same manner as in Example 2 using the conditions indicated in Table 1, cups were obtained and evaluated. The results are shown in Tables 1 and 2.

Comparative Examples 1 to 7

In the same manner as in Example 2 using the conditions indicated in Table 1, cups were obtained and evaluated. The results are shown in Tables 1 and 2.

Examples 8 to 11

Using a co-etrusion sheet molding apparatus as used in Example 1, there was obtained a multilayered structure made of three types of resins and having five layers of PO (A)/AD/EVOH (B)/AD/PO (A) (layer thicknesses: 425μ/25μ/100μ/25μ/425μ). 95 parts by weight of a milled scrap of the sheet was blended with 5 parts by weight of modified PO (C) as used in Example 1 and 0.1 part by weight of the hydrotalcite as used in Example 1, followed by pelletization by use of an extruder having a diameter of 40 mm. The resultant resin composition was used to obtain cups in the same manner as in Example 1, followed by evaluation. The results of the evaluation are shown in Tables 3 and 4.

It will be noted that the PO (A) used in the examples were high density polyethylene (HDPE) having a melt index of 0.05 g/10 minutes and that the extrusion molding temperature of the PO (A) ranged from 220 to 240° C.

Comparative Examples 8 to 15

In the same manner as in Example 1 using the conditions indicated in Table 3, cups were obtained and evaluated. The results are shown in Tables 3 and 4.

Example 12

The general procedure of Example 2 was repeated except that there was used, instead of 5 parts by weight of the modified PO (C) and 0.1 part by weight of DHT-4A, 10 parts by weight of a composition comprised PO(C) and DHT-4A diluted with low density polyethylene (LDPE) (LDPE/modified PO (C) - 50 wt %/50 wt % formulated therein with 0.3 wt % of DHT-4A), thereby obtaining cups. The cups were evaluated in the same manner as in the foregoing examples, revealing that the cups were substantially free of any wavy pattern, gel and hard spot and had a cup breakage height of 2.8 m and an intralayer separation strength of 2.5 kg/15 mm in width.

Example 13

The general procedure of Example 12 was repeated except that 10 parts by weight of the composition comprising PO (C) and DHT-4A was reduced to 5 parts by weight, thereby obtaining cups. The results of evaluation reveal that the cups were substantially free of any wavy pattern, gel and hard spot and had a cup breakage height of 2.2 m and an intralayer separation strength of 2.1 kg/15 mm in width.

Example 14

The general procedure of Example 13 was repeated except that 0.3 wt % of DHT-4A was increased to 0.6 wt %, thereby obtaining cups. The results of evaluation reveal that the cups were substantially free of any wavy pattern, gel and hard spot and had a cup breakage height of 2.4 m and an intralayer separation strenght of 2.4 Kg/15 mm in width.

As will be apparent from the foregoing, the resin composition of the invention exhibits good compatibility and is free of any flow anomaly. The multilayered structure comprising, at least, a resin composition layer and an EVOH layer does not involve any gel, hard spot and any wavy pattern, thus having not only a good appearance, but also good impact resistance and intralayer separation resistance.

TABLE 1

|  |  | Multilayered sheet for starting scrap | | | | | | Added resin composition(pre-pellets) | | | | | |
|---|---|---|---|---|---|---|---|---|---|---|---|---|---|
|  |  | PO | | | | PO | | PO(A) | | EVOH(B) | | Modified PO(C) | |
|  |  | (A) 425 (μ) | AD 25 (μ) | EVOH 100 (μ) | AD 25 (μ) | (A) 425 (μ) | Parts by weight | Brand or Product Name | Parts by weight | Brand or Product Name | Parts by weight | Brand or Product Name | Parts by weight |
| Example | 1 | — | — | — | — | — | 0 | PP | 80 | EV-1 | 10 | HA-E-EA-1 | 5 |
|  | 2 | PP | AD-1 | EV-1 | AD-1 | PP | 95 | — | 0 | — | 0 | HA-E-EA-1 | 5 |
|  | 3 | PP | AD-1 | EV-2 | AD-1 | PP | 97 | — | 0 | — | 0 | HA-E-EA-2 | 3 |
|  | 4 | PP | AD-1 | EV-1 | AD-1 | PP | 95 | — | 0 | — | 0 | HA-EVA | 5 |
|  | 5 | PP | AD-1 | EV-1 | AD-1 | PP | 95 | — | 0 | — | 0 | HA-E-EA-1 | 5 |
|  | 6 | PP | AD-1 | EV-1 | AD-1 | PP | 95 | — | 0 | — | 0 | HA-E-EA-1 | 5 |
|  | 7 | PP | AD-1 | EV-1 | AD-1 | PP | 95 | — | 0 | — | 0 | HA-E-EA-1 | 5 |

TABLE 1-continued

| | | | | | | | | | | | | | |
|---|---|---|---|---|---|---|---|---|---|---|---|---|---|
| Comparative | 1 | PP | AD-1 | EV-1 | AD-1 | PP | 100 | — | 0 | — | 0 | — | 0 |
| Example | 2 | PP | AD-1 | EV-1 | AD-1 | PP | 95 | — | 0 | — | 0 | E-EA | 5 |
| | 3 | PP | AD-1 | EV-1 | AD-1 | PP | 95 | — | 0 | — | 0 | MAn-EVA | 5 |
| | 4 | PP | AD-1 | EV-1 | AD-1 | PP | 95 | — | 0 | — | 0 | MAn-EEA | 5 |
| | 5 | PP | AD-1 | EV-1 | AD-1 | PP | 95 | — | 0 | — | 0 | Ionomer | 5 |
| | 6 | PP | AD-1 | EV-1 | AD-1 | PP | 95 | — | 0 | — | 0 | MA-E | 5 |
| | 7 | PP | AD-1 | EV-1 | AD-1 | PP | 95 | — | 0 | — | 0 | MAn-PP | 5 |

| | | Added resin composition(pre-pellets) | | | | | |
|---|---|---|---|---|---|---|---|
| | | AD | | (D)and/or(E) | | (F) | |
| | | Brand or Product Name | Parts by weight | Brand or Product Name | Parts by weight | Alkali metal ion | Ratio to EVOH, ppm |
| Example | 1 | AD-1 | 5 | DHT4A | 0.1 | Na | 50 |
| | 2 | — | 0 | DHT4A | 0.1 | K | 50 |
| | 3 | — | 0 | DHT4A | 0.1 | Na | 50 |
| | 4 | — | 0 | DHT4A | 0.1 | Na | 50 |
| | 5 | — | 0 | Mg-St | 0.1 | Na | 40 |
| | 6 | — | 0 | — | 0 | Na | 50 |
| | 7 | — | 0 | DHT4A Mg-St | 0.1 0.1 | Na | 50 |
| Comparative | 1 | — | 0 | — | 0 | Na | 3 |
| Example | 2 | — | 0 | — | 0 | Na | 3 |
| | 3 | — | 0 | — | 0 | Na | 50 |
| | 4 | — | 0 | — | 0 | Na | 50 |
| | 5 | — | 0 | — | 0 | Na | 50 |
| | 6 | — | 0 | — | 0 | Na | 50 |
| | 7 | — | 0 | — | 0 | Na | 50 |

PP: Polypropylene (Noblen YP220 of Mitsubishi Petrochemical Co., Ltd.)
AD-1: Maleic anhydride-grafted polypropylene
HA-E-EA-1: Maleic anhydride-ethylene-ethyl acrylate terpolymer (maleic anhydride: 4 wt %, ethylene: 60 wt %, ethyl acrylate: 36 wt %)
HA-E-EA-2: Maleic anhydride-ethylene-ethyl acrylate terpolymer (maleic anhydride: 2.4 wt %, ethylene: 92.6 wt %, ethyl acrylate: 5.0 wt %)
HA-EVA: Maleic anhydride-ethylene-vinyl acetate terpolymer (maleic anhydride: 2 wt %, ethylene: 88 wt %, vinyl acetate: 10 wt %)
HA-E: Maleic anhydride-ethylene copolymer (maleic anhydride: 8 wt %, ethylene: 92 wt %)
MAn-EVA: Maleic anhydride-grafted ethylene-vinyl acetate copolymer (maleic anhydride: 0.3 wt %, ethylene: 79.7 wt %, vinyl acetate: 20 wt %)
E-EA: Ethylene-ethyl acrylate copolymer (ethylene: 50 wt %, ethyl acrylate: 50 wt %)
MAn-EEA: Maleic anhydride-grafted ethylene-ethyl acrylate copolymer (maleic anhydride: 0.3 wt %, ethylene: 79.7 wt %, ethyl acrylate: 20 wt %)
Ionomer: Sodium salt of ethylene-acrylic acid copolymer
HA-E: Maleic anhydride-ethylene copolymer (maleic anhydride: 50 wt %, ethylene: 50 wt %)
MAn-PP: Maleic anhydride-grafted polypropylene (maleic anhydride: 0.3 wt %)
EV-1: EVOE (having an ethylene content of 31 mole %, a saponification degree of 99.5%, and a melting point of 183° C. and containing alkali meal ions derived from sodium acetate and/or potassium acetate)
EV-2: Blend of EV-1 and HA-E-EA-2 at a ratio by weight of 10:2
Mg-St: Magnesium stearate

TABLE 2

| | | Composition | | Arrangement of Multiayered Structure | | | | | | Characteristic Properties of Multilayered Structure | | | |
|---|---|---|---|---|---|---|---|---|---|---|---|---|---|
| | | | | | | | | | | | | Performance | |
| | | Formula (I) | Formula (II) | Outermost layer | Composition layer | AD layer | EVOH layer | AD layer | Innermost layer | Appearance | | Breakage of cup by | Intralayer separating |
| | | (B)/ (A) | (C)/ (A + B) | 100 ($\mu$) | 600 ($\mu$) | 25 ($\mu$) | 100 ($\mu$) | 25 ($\mu$) | 150 ($\mu$) | Wavy pattern | Gels, hard spots | dropping (m) | (kg/15 mm width) |
| Example | 1 | 10/80 | 5/90 | PP | Composition | AD-1 | EV-1 | AD-1 | PP | Slightly formed | Nil | 1.5 | 1.2 |
| | 2 | 10/80 | 5/90 | PP | Composition | AD-1 | EV-1 | AD-1 | PP | Nil | Nil | 2.0 | 2.0 |
| | 3 | 10/80 | 5/90 | PP | Composition | AD-1 | EV-2 | AD-1 | PP | Nil | Nil | 2.8 | 2.6 |
| | 4 | 10/80 | 5/90 | PP | Composition | AD-1 | EV-1 | AD-1 | PP | Nil | Nil | 2.0 | 1.8 |
| | 5 | 10/80 | 5/90 | PP | Composition | AD-1 | EV-1 | AD-1 | PP | Nil | Very small in number | 1.5 | 1.2 |
| | 6 | 10/80 | 5/90 | PP | Composition | AD-1 | EV-1 | AD-1 | PP | Slightly formed | Very small in number | 1.4 | 1.1 |
| | 7 | 10/80 | 5/90 | PP | Composition | AD-1 | EV-1 | AD-1 | PP | Nil | Nil | 2.3 | 2.3 |

TABLE 2-continued

| | | Composition | | Arrangement of Multiayered Structure | | | | | Characteristic Properties of Multilayered Structure | | | |
|---|---|---|---|---|---|---|---|---|---|---|---|---|
| | | | | | | | | | Appearance | | Performance | |
| | | Formula (I) | Formula (II) | Outermost layer | Composition layer | AD layer | EVOH layer | AD layer | Innermost layer | | | Breakage of cup by dropping (m) | Intralayer separating (kg/15 mm width) |
| | | (B)/(A) | (C)/(A+B) | 100 ($\mu$) | 600 ($\mu$) | 25 ($\mu$) | 100 ($\mu$) | 25 ($\mu$) | 150 ($\mu$) | | | | |
| Comparative Example | 1 | 10/80 | 0/90 | PP | Composition | AD-1 | EV-1 | AD-1 | PP | Wavy pattern Greatly formed | Gels, hard spots Small in number | 0.6 | 0.3 |
| | 2 | 10/80 | 1/90 | PP | Composition | AD-1 | EV-1 | AD-1 | PP | Appreciably formed | Small in number | 0.8 | 0.6 |
| | 3 | 10/80 | 4/90 | PP | Composition | AD-1 | EV-1 | AD-1 | PP | Appreciably formed | Small in number | 0.7 | 0.5 |
| | 4 | 10/80 | 4/90 | PP | Composition | AD-1 | EV-1 | AD-1 | PP | Appreciably formed | Small in number | 0.7 | 0.5 |
| | 5 | 10/80 | 1/90 | PP | Composition | AD-1 | EV-1 | AD-1 | PP | Appreciably formed | Small in number | 0.7 | 0.5 |
| | 6 | 10/80 | 1/90 | PP | Composition | AD-1 | EV-1 | AD-1 | PP | Appreciably formed | Small in number | 0.8 | 0.6 |
| | 7 | 10/80 | 1/90 | PP | Composition | AD-1 | EV-1 | AD-1 | PP | Slightly formed | Very small in number | 0.7 | 0.5 |

TABLE 3

| | | Multilayered sheet for starting scrap | | | | | | Added resin composition(pre-pellets) | | | | | |
|---|---|---|---|---|---|---|---|---|---|---|---|---|---|
| | | PO | | | | PO | | PO(A) | | EVOH(B) | | Modified PO(C) | |
| | | (A) 425 ($\mu$) | AD 25 ($\mu$) | EVOH 100 ($\mu$) | AD 25 ($\mu$) | (A) 425 ($\mu$) | Parts by weight | Brand or Product Name | Parts by weight | Brand or Product Name | Parts by weight | Brand or Product Name | Parts by weight |
| Example | 8 | HDPE | AD-2 | EV-1 | AD-2 | HDPE | 95 | — | 0 | — | 0 | HA-E-EA-1 | 5 |
| | 9 | HDPE | AD-2 | EV-2 | AD-2 | HDPE | 97 | — | 0 | — | 0 | HA-E-EA-1 | 3 |
| | 10 | HDPE | AD-2 | EV-1 | AD-2 | HDPE | 95 | — | 0 | — | 0 | HA-E-EA-1 | 5 |
| | 11 | HDPE | AD-2 | EV-1 | AD-2 | HDPE | 95 | — | 0 | — | 0 | HA-E-EA-1 | 5 |
| Comparative Example | 8 | HDPE | AD-2 | EV-1 | AD-2 | HDPE | 100 | — | 0 | — | 0 | — | 0 |
| | 9 | HDPE | AD-2 | EV-1 | AD-2 | HDPE | 95 | — | 0 | — | 0 | E-EA | 5 |
| | 10 | HDPE | AD-2 | EV-1 | AD-2 | HDPE | 95 | — | 0 | — | 0 | MAn-EVA | 5 |
| | 11 | HDPE | AD-2 | EV-1 | AD-2 | HDPE | 95 | — | 0 | — | 0 | MAn-EVA | 5 |
| | 12 | HDPE | AD-2 | EV-1 | AD-2 | HDPE | 95 | — | 0 | — | 0 | Ionomer | 5 |
| | 13 | HDPE | AD-2 | EV-1 | AD-2 | HDPE | 95 | — | 0 | — | 0 | HA-E | 5 |
| | 14 | HDPE | AD-2 | EV-1 | AD-2 | HDPE | 95 | — | 0 | — | 0 | MAn-PP | 5 |
| | 15 | HDPE | AD-2 | EV-3 | AD-2 | HDPE | 95 | — | 0 | — | 0 | HA-E-MMA | 5 |

| | | Added resin composition(pre-pellets) | | | | | |
|---|---|---|---|---|---|---|---|
| | | AD | | (D)and/or(E) | | (F) | |
| | | Brand or Product Name | Parts by weight | Brand or Product Name | Parts by weight | Alkali metal ion | Ratio to EVOH, ppm |
| Example | 8 | — | 0 | DHT4A | 0.1 | Na | 50 |
| | 9 | — | 0 | DHT4A | 0.1 | Na | 50 |
| | 10 | — | 0 | — | — | Na | 50 |
| | 11 | — | 0 | DHT4A Mg-St | 0.1 0.1 | Na | |
| Comparative Example | 8 | — | 0 | — | 0 | Na | 3 |
| | 9 | — | 0 | — | 0 | Na | 3 |
| | 10 | — | 0 | — | 0 | Na | 50 |
| | 11 | — | 0 | — | 0 | Na | 50 |
| | 12 | — | 0 | — | 0 | Na | 50 |
| | 13 | — | 0 | — | 0 | Na | 50 |
| | 14 | — | 0 | — | 0 | Na | 50 |
| | 15 | — | 0 | — | 0 | Na | |

TABLE 3-continued

| | | Composition | | Arrangement of Multilayered Structure | | | | | | Characteristic Properties of Multilayered Structure | | | |
|---|---|---|---|---|---|---|---|---|---|---|---|---|---|
| | | | | | | | | | | | | \multicolumn{2}{c}{Performance} |
| | | Formula (I) | Formula (II) | Outermost layer | Composition layer | AD layer | EVOH layer | AD layer | Innermost layer | \multicolumn{2}{c}{Appearance} | Breakage of cup by | Intralayer separating |
| | | (B)/(A) | (C)/(A+B) | 100 ($\mu$) | 600 ($\mu$) | 25 ($\mu$) | 100 ($\mu$) | 25 ($\mu$) | 150 ($\mu$) | Wavy pattern | Gels, hard spots | dropping (m) | (kg/15 mm width) |
| Example | 8 | 10/80 | 5/90 | HDPE | Composition | AD-2 | EV-1 | AD-2 | HDPE | Nil | Nil | 5.0 | 3.2 |
| | 9 | 10/80 | 5/90 | HDPE | Composition | AD-2 | EV-2 | AD-2 | HDPE | Nil | Nil | 5.0 | 3.8 |
| | 10 | 10/80 | 5/90 | HDPE | Composition | AD-2 | EV-1 | AD-2 | HDPE | Slightly formed | Very small in number | 4.5 | 3.0 |
| | 11 | 10/80 | 5/90 | HDPE | Composition | AD-2 | EV-1 | AD-2 | HDPE | Nil | Nil | 5.5 | 4.0 |
| Comparative Example | 8 | 10/80 | 0/90 | HDPE | Composition | AD-2 | EV-1 | AD-2 | HDPE | Greatly Very formed | Very small in number | 2.0 | 0.4 |
| | 9 | 10/80 | 1/90 | HDPE | Composition | AD-2 | EV-1 | AD-2 | HDPE | Appreciably formed | Small in number | 2.4 | 0.7 |
| | 10 | 10/80 | 4/90 | HDPE | Composition | AD-2 | EV-1 | AD-2 | HDPE | Appreciably formed | Small in number | 2.3 | 0.6 |
| | 11 | 10/80 | 4/90 | HDPE | Composition | AD-2 | EV-1 | AD-2 | HDPE | Appreciably formed | Small in number | 2.4 | 0.7 |
| | 12 | 10/80 | 1/90 | HDPE | Composition | AD-2 | EV-1 | AD-2 | HDPE | Appreciably formed | Great in number | 2.8 | 0.7 |
| | 13 | 10/80 | 1/90 | HDPE | Composition | AD-2 | EV-1 | AD-2 | HDPE | Appreciably formed | Small in number | 2.4 | 0.6 |
| | 14 | 10/80 | 1/90 | HDPE | Composition | AD-2 | EV-1 | AD-2 | HDPE | Slightly formed | Very small in number | 3.0 | 0.7 |
| | 15 | 10/80 | 5/90 | HDPE | Composition | AD-2 | EV-3 | AD-2 | HDPE | Appreciably formed | Great in number | 2.5 | 1.0 |

HDPE: High density polyethylene
HA-E-MMA: Maleic anhydride-ethylene-methyl methacrylate terpolymer (maleic anhydride: 3 wt %, ethylene: 89 wt %, methyl methacrylate: 8 wt %)
AD-2: Maleic anhydride-grafted high density polyethylene (Adomer of Mitsui Petrochemical Industries, Ltd.)
EV-3: EVOH (having an ethylene content of 80 mole %, a saponification degree of 92%, and a melting point of 96° C.)

What is claimed is:

1. A multilayered structure which comprises at least three layers comprising:
   a first layer (1) made of a resin composition comprising:
   a polyolefin (A);
   a saponified product (B) of an ethylene-vinyl ester copolymer having an ethylene content of from 10 to 70 mole %, a saponification degree of the vinyl ester component of not less than 80%, and a melting point of from 125° C. to 220° C.; and
   an olefin-unsaturated dicarboxylic anhydride-unsaturated carboxylic ester or vinyl ester telpolymer (C), with the proviso that (A) is not identical to (B) or (C), wherein the following formulas of (I) and (II) are satisfied:

$1/99 \leq \text{weight of } (B)/\text{weight of } (A) \leq 40/60$ $0.1/99 \leq X \leq 20/80$ wherein X=weight of (C)/total weight of (A) and (B);
   a second layer (2) made of a saponified product of ethylene-vinyl ester copolymer having an ethylene content of 10 to 70 mole % and a saponification degree of the vinyl ester component of not less than 90%; and
   a third layer (3) made of a polymer obtained by grafting an unsaturated carboxylic acid or anhydride thereof to an olefin polymer, wherein the third layer (3) is positioned between the first layer (1) and the second layer (2).

2. The multilayered structure according to claim 1 wherein the first layer (1) further comprises a hydrotalcite compound (D) in an amount of from 0.0001 to 2% based on the total weight of (A) and (B).

3. The multilayered structure according to claim 1 wherein the first layer (1) further comprises a metal salt (E) of an aliphatic carboxylic acid having from 8 to 22 carbon atoms in an amount of from 0.0001 to 2% based on the total weight of (A) and (B).

4. The multilayered structure according to claim 1 wherein the first layer (1) further comprises at least one metal ion selected from lithium ion, sodium ion and potassium ion in an amount of from 5 to 5000 ppm based on the total weight of (B).

* * * * *

UNITED STATES PATENT AND TRADEMARK OFFICE
CERTIFICATE OF CORRECTION

PATENT NO.   : 6,258,464 B1  
DATED        : July 10, 2001  
INVENTOR(S)  : Taichi Negi, Kaoru Ikeda and Hiromichi Nakano Page 1 of 1

It is certified that error appears in the above-identified patent and that said Letters Patent is hereby corrected as shown below:

<u>Claim 1,</u>  
Lines 15 and 16 should read:

-- $1/99 \leq$ weight of (B)/weight of (A) $\leq 40/60$     (I)

$0.1/99 \leq X \leq 20/80$     (II) --

Signed and Sealed this

Sixteenth Day of April, 2002

Attest:

Attesting Officer

JAMES E. ROGAN  
*Director of the United States Patent and Trademark Office*